No. 858,531. PATENTED JULY 2, 1907.
E. F. PALMER.
TOBACCO CLIPPER.
APPLICATION FILED MAY 13, 1907.
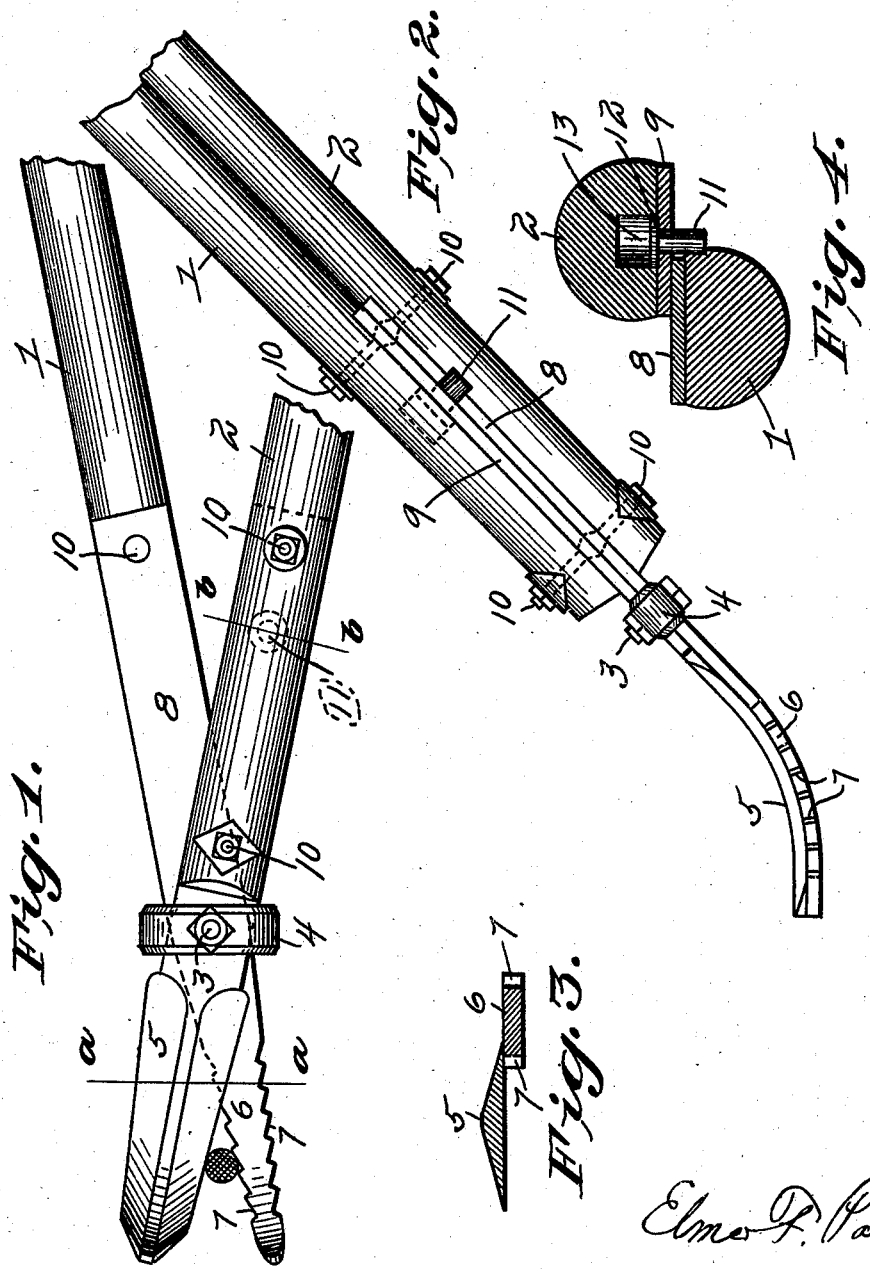

UNITED STATES PATENT OFFICE.

ELMER F. PALMER, OF MIAMISBURG, OHIO.

TOBACCO-CLIPPER.

No. 858,531.     Specification of Letters Patent.     Patented July 2, 1907.

Application filed May 13, 1907. Serial No. 373,283.

*To all whom it may concern:*

Be it known that I, ELMER F. PALMER, a citizen of the United States, residing at Miamisburg, in the county of Montgomery and State of Ohio, have invented certain new and useful Improvements in Tobacco-Clippers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in tobacco clippers or cutters for cutting the stems of tobacco plants preparatory to drying the same.

The object of the invention is to provide a tobacco clipper by means of which the operator is enabled to cut each row of tobacco plants as he travels back and forth, and to permit of the tobacco plants falling uniformly on the same sides of the rows as they are cut.

A further object of the invention is to provide means for retaining each stalk of tobacco in an upright position between the blades of the cutter while the blades are being closed upon the stalk.

Preceding a more detailed description of the invention, reference is made to the accompanying drawings, of which—

Figure 1, is a top plan view of my improved tobacco clipper showing the same engaging a stalk and the handles of which are broken away. Fig. 2, is a side elevation of the cutter. Fig. 3, is a cross section of the blades on the line *a—a* of Fig. 1. Fig. 4, is a section on the line *b—b* of Fig. 1 showing the handles closed against the stop.

In a detail description of the invention, similar reference characters indicate corresponding parts of the drawings.

The operating handles 1 and 2 are of sufficient length to permit of the operator standing erect in cutting the tobacco plants. The lower or retaining blade 6 has a suitable curvature to catch the standing plants in a proper manner by means of the notches 7 which are arranged on both sides of said blade. The upper or cutting blade 5 has both of its upper sides tapered downwardly and outwardly from the cutting edges so that when said blade 5 is closed upon the standing plants held by the co-operating blade 6, the plants are caused to fall in one direction when severed. The shanks or extensions 8 and 9 of the blades are connected to the operating handles 1 and 2 by means of a suitable number of counter-sunk bolts 10 which receive nuts and washers on the outer sides of the handles. The handles and blades are pivoted to each other by a pin 3 which passes through a guard or loop 4 which surrounds the shanks of the blades between the blades and the ends of the handles.

Mounted within the handle 2 of the upper blade 5 is a gravity pin 11 which acts as a stop to prevent the handles from closing one over the other and the possibility of clamping the fingers of the operator. This gravity stop 11 passes loosely through the shank 9 of the upper cutting blade and is retained in its operative position as shown in Figs. 2 and 4 by a head 12 on the inner end thereof which lies within a recess 13 in the handle 2. When the implement is in the operative position as shown in Figs. 1 and 2, the pin drops by gravity a sufficient distance to act as a stop for the blades or handles as specified. When the implement is turned over or reversed from the position shown in Figs. 1 and 2, and in which position the lower retaining blade would be on top, the pin drops by gravity into the recess 13 and permits the handles to be crossed to put the implement in a condition to cut the next row of tobacco plants and the implement is then reversed to its normal or operative position and the stop 11 drops to the position to prevent the handles from closing a sufficient extent to catch the fingers of the operator.

The following is a brief description of the implement: In order to facilitate the gathering of the tobacco after being clipped, it is desired that each clipped row shall lie uniformly on one side, and it is also desired that the operator be not compelled to begin the clipping of the plants from the same ends of the rows. These objects are accomplished by beveling the clipping blade 5 in opposite directions as shown and described and in providing means which enable the handles to be reversed when at the end of each row so that the two edges of the blades may be utilized in traveling back and forth along each two rows of the standing tobacco. The gravity pin or stop 11 enables this reversing of the operating handles and the blades for each row of tobacco.

I claim:

1. A tobacco clipper comprising a lower retaining blade having its longitudinal edges notched, an upper cutting blade co-operating with the retaining blade to cut the tobacco plants when held in erect positions by the retaining blade, said upper cutting blade having its upper side beveled downwardly and outwardly, operating handles to which the shanks of the cutting blades are united, a pivot pin uniting said cutting blades, and a gravity stop located in the handle of the upper cutting blade and adapted to limit the closing movements of the handles, and to permit of said handles being reversed to utilize both edges of the retaining blade and the cutting blade, substantially as specified.

2. In a tobacco clipper, a lower retaining blade having its width gradually reduced from the pivotal point to the end thereof, and its opposite edges provided with notches to hold the plants in upright positions, a cutting blade pivoted to the retaining blade and having its upper side beveled downwardly and outwardly from the longitudinal center of said blade and providing oppositely-disposed cutting edges which co-operate with the oppositely-disposed retaining edges of the lower retaining blade, handles to which said blades are attached, a stop pin mounted in a recess in the handle of the cutting blade, said stop pin having a head which retains the pin in an operative position to limit the closing movement of the handles when cutting the plants on either side of the blades, substantially as specified.

In testimony whereof I affix my signature, in presence of two witnesses.

ELMER F. PALMER.

Witnesses:
  R. J. McCARTY,
  CAROLYN M. THEOBALD.